United States Patent
Hu et al.

(10) Patent No.: US 9,696,576 B2
(45) Date of Patent: Jul. 4, 2017

(54) PEN WRITING ON ONE-DIMENSIONAL CAPACITIVE TOUCH SENSOR

(71) Applicant: Touchplus Information Corp., New Taipei (TW)

(72) Inventors: Shih-Hsien Hu, New Taipei (TW); Yaosheng Chou, New Taipei (TW)

(73) Assignee: TOUCHPLUS INFORMATION CORP., New Taipei (TW)

( * ) Notice: Subject to any disclaimer, the term of this patent is extended or adjusted under 35 U.S.C. 154(b) by 0 days.

(21) Appl. No.: 15/285,992

(22) Filed: Oct. 5, 2016

(65) Prior Publication Data

US 2017/0023818 A1 Jan. 26, 2017

Related U.S. Application Data

(63) Continuation-in-part of application No. 14/029,753, filed on Sep. 17, 2013, now abandoned.

(30) Foreign Application Priority Data

Sep. 18, 2012 (TW) .............................. 101134178 A

(51) Int. Cl.
| | |
|---|---|
| G02F 1/1333 | (2006.01) |
| G06F 3/0354 | (2013.01) |
| G06F 3/044 | (2006.01) |
| G06F 3/041 | (2006.01) |

(52) U.S. Cl.
CPC .... *G02F 1/13338* (2013.01); *G02F 1/133345* (2013.01); *G06F 3/03545* (2013.01); *G06F 3/044* (2013.01); *G06F 3/0412* (2013.01); *G06F 2203/04102* (2013.01); *G06F 2203/04107* (2013.01); *Y10T 29/49105* (2015.01)

(58) Field of Classification Search
CPC ... G02F 1/13338; G06F 3/0345; G06F 3/0412
See application file for complete search history.

(56) References Cited

U.S. PATENT DOCUMENTS

| | | | | |
|---|---|---|---|---|
| 2006/0097991 | A1* | 5/2006 | Hotelling | G06F 3/0416 345/173 |
| 2010/0039407 | A1* | 2/2010 | Chuang | G06F 3/044 345/174 |
| 2010/0073319 | A1* | 3/2010 | Lyon | G06F 3/044 345/174 |

(Continued)

FOREIGN PATENT DOCUMENTS

| | | |
|---|---|---|
| TW | M364242 | 9/2009 |
| TW | M434248 | 7/2012 |

*Primary Examiner* — Phu Vu
(74) *Attorney, Agent, or Firm* — WPAT, PC

(57) ABSTRACT

A touch panel includes a base, which is a liquid crystal module serving as a ground; a flexible dielectric layer over the base; and a one-dimensional pattern layer with sensor cells positioned as the same layer over the flexible dielectric layer. The sensor cells form a sensor array, and each of the sensor cells is individually controlled and sensed via an independent sensing line, wherein press sensing control is conducted according to a capacitance change resulting from a distance change between the sensor array and the base in response to an external force, and touch or gesture-based sensing control is conducted according to a capacitance change in the sensor array without involving the base.

22 Claims, 7 Drawing Sheets

(56) References Cited

U.S. PATENT DOCUMENTS

| | | | | |
|---|---|---|---|---|
| 2013/0009653 A1* | 1/2013 | Fukushima | ............. | G06F 3/044 324/679 |
| 2015/0331517 A1* | 11/2015 | Filiz | ..................... | G06F 3/0414 345/173 |
| 2016/0139716 A1* | 5/2016 | Filiz | ..................... | G06F 3/0414 345/174 |

* cited by examiner

PEN WRITING ON ONE-DIMENSIONAL CAPACITIVE TOUCH SENSOR

CROSS-REFERENCE TO RELATED APPLICATIONS

The present application is a continuation-in-part application claiming benefit from a parent U.S. patent application bearing a Ser. No. 14/029,753 and filed Sep. 17, 2013, contents of which are incorporated herein for reference.

FIELD OF THE INVENTION

The present invention relates to a touch panel, and more particularly to a touch panel exhibiting a press sensing control function.

BACKGROUND OF THE INVENTION

Capacitive sensing is a technology based on capacitive coupling which takes human body capacitance as an input. The capacitive touch sensor has been widely used in smart phones, tablets and even in the IT displays up to 23 inches, e.g. Notebooks, laptop trackpads, digital audio players, computer displays, all-in-one PCs, with the multi-touch features.

More and more design engineers are selecting capacitive sensors for their versatility, reliability and robustness, unique human-device interface and cost reduction over mechanical switches.

Capacitive sensors detect anything that is conductive or has a dielectric different than that of air. While capacitive sensing applications can replace mechanical buttons with capacitive alternatives, other technologies such as multi-touch and gesture-based touch screens are also premised on capacitive sensing.

Capacitive sensors are constructed from many different media, such as copper, Indium Tin Oxide (ITO) and printed ink. Copper capacitive sensors can be implemented on Printing Circuit Boards (PCBs) as well as on flexible material. Indium Tin Oxide allows the capacitive sensor to be up to 90% transparent for one layer solutions, such as touch phone screens.

In the industry of resistive touch panels, pen writing has been used for many years. The most critical part of a resistive touch panel is the reliability issue. The resistive film is subjected to worn-out problems after intensive use. The resistive touch panel provides the writing experience close to the writing habit of people, and the tip of the pen can be small enough to have relatively high writing resolution.

In the meantime, the technique of the projected capacitive touch panel, which measures the variation of capacitance where the fingers are touching, also advances.

FIG. 1A and FIG. 1B schematically show the structures of conventional two-dimensional sensor arrays (110, 120). In consideration of coordination accuracy of touched locations, the touch sensors often come with two-dimensional sensor arrays, including Double-sided Indium Tin Oxide (DITO) or Single-sided Indium Tin Oxide (SITO). The size of the sensor element from the sensor array is about the fingertip size (5-8 mm) The patterns of the sensor elements are mostly the bar shape, the diamond shape or other polygon shapes. For example, FIG. 1A shows that the pattern of the sensor elements (118, 116) in a two-dimensional sensor array 110 is the bar shape, and the two-dimensional sensor array 110 includes a bottom layer 112 and a top layer 114. FIG. 1B shows that the pattern of the sensor element 122 in a two-dimensional sensor array 120 is the diamond shape.

In general, the two-dimensional sensor array constructed as a matrix-like or keyboard-like structure has less constraint on the trace routing and provides better touch accuracy when compared with the one-dimensional sensor array for multi-touch applications. However, the two-dimensional sensor array costs higher than one-dimensional sensor array in manufacturing.

To have a better Signal to Noise Ratio (SNR) measurement for the finger identification in the traditional sensor array, the area touched by the finger cannot be too small, and the required diameter of the area touched by the finger is about 6 to 9 mm. The required area is relatively large, and thus it is difficult to do the sophisticated pen writing on the capacitive touch screen, especially for the Chinese characters.

FIG. 2 schematically shows the perspective view of another conventional capacitive touch display incorporating a digitizer at the backside. The capacitive touch display 200 includes a capacitive touch panel 202, a thin film transistor liquid crystal module (TFT LCM) panel 204, and a digitizer panel 206. The conventional capacitive touch display with an additional digitizer or an active writing pen provides a pen writing function, but needs extra cost.

Thus, the conventional capacitive touch display suffers from the following drawbacks: (1) the cost is then increased dramatically; (2) the specific digitizer pen is required; (3) the complex mechanical design is required to avoid the signal interference; and (4) the entire device gets thicker.

Therefore, it is desirable to create a capacitive touch sensor to resolve the above-mentioned issues.

SUMMARY OF THE INVENTION

The present invention provides a touch panel comprising: a base, which is a liquid crystal module serving as a ground; a flexible dielectric layer over the base; and a one-dimensional pattern layer with sensor cells positioned as the same layer over the flexible dielectric layer, wherein the sensor cells form a sensor array, and each of the sensor cells is individually controlled and sensed via an independent sensing line, wherein press sensing control is conducted according to a capacitance change resulting from a distance change between the sensor array and the base in response to an external force, and touch or gesture-based sensing control is conducted according to a capacitance change in the sensor array without involving the base.

The invention further provides a touch panel comprising: a liquid crystal module for displaying images and serving as a ground; a pattern layer with sensor cells positioned as the same layer over the liquid crystal module wherein the sensor cells form a sensor array and each of the sensor cells is individually controlled and sensed via an independent sensing line; a sensor plate positioned over the sensor array for protecting the sensor array; and a spacer structure positioned between the sensor plate and the liquid crystal module; wherein the spacer structure and the sensor plate are flexible, and the gap is used for allowing deformation of the sensor plate and spacer structure; and wherein press sensing control is conducted according to a capacitance change between the sensor array and the liquid crystal module, and touch or gesture-based sensing control is conducted according to a capacitance change in the sensor array without involving the liquid crystal module.

Due to the specific configuration of the pattern layer with sensor cells as recited above, a liquid crystal module, which primarily functions for image displaying, can be used as a base (ground) for press sensing control, and no additional ground is needed, cost and manufacturing can be more effective.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In order to fully understand the manner in which the above-recited details and other advantages and objects according to the invention are obtained, a more detailed description of the invention will be rendered by reference to the best-contemplated mode and specific embodiments thereof. The following description of the invention is made for the purpose of illustrating the general principles of the invention and should not be taken in a limiting sense; it is intended to illustrate various embodiments of the invention. As such, the specific modifications discussed are not to be construed as limitations on the scope of the invention. It will be apparent to one skilled in the art that various equivalents, changes, and modifications may be made without departing from the scope of the invention, and it is understood that such equivalent embodiments are to be included herein. The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section. Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Preferred embodiments and aspects of the invention will be described to explain the scope, structures and procedures of the invention. In addition to the preferred embodiments of the specification, the present invention can be widely applied in other embodiments.

Figure 1A:
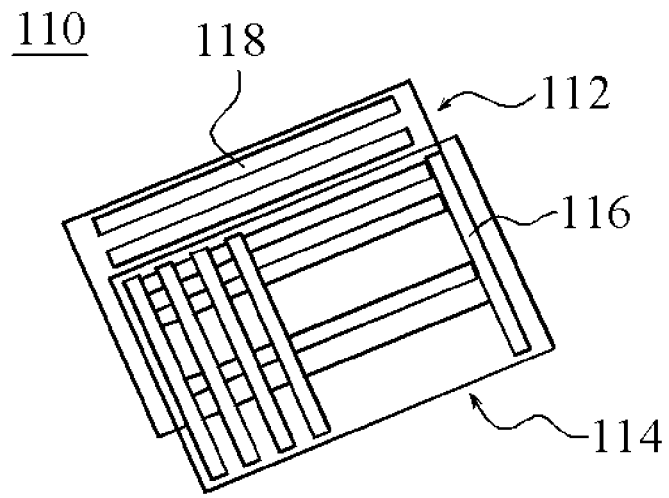
FIGS. 1A and 1B are schematic diagrams illustrating structures of conventional two-dimensional sensor arrays.
Figure 1B:
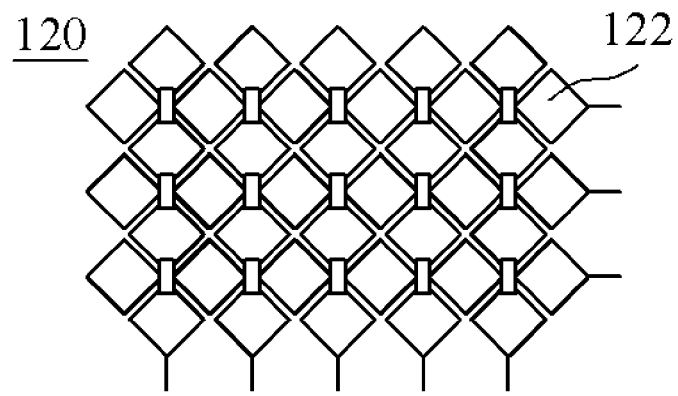
Figure 2:
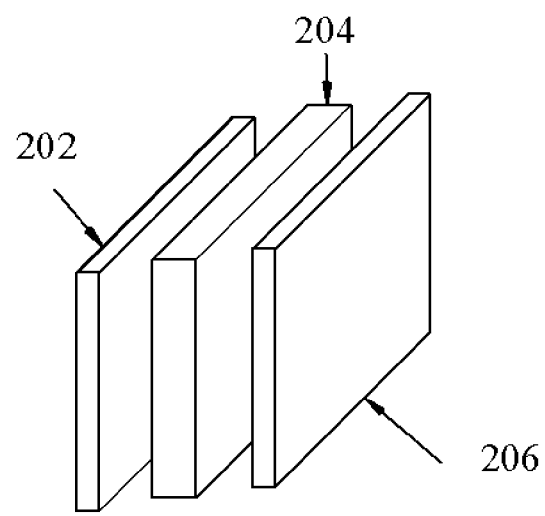
FIG. 2 is a schematic perspective view of another conventional capacitive touch display incorporating a digitizer at the backside.
Figure 3:
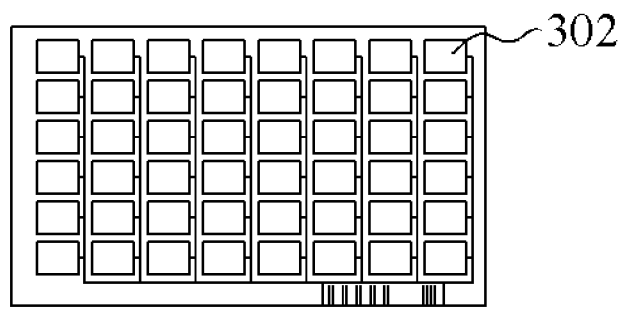
FIG. 3 is a schematic diagram illustrating a pattern of a one-dimensional capacitive touch panel according to an embodiment of the invention.

Please refer to FIG. 3. According to an embodiment of the invention, each sensor cell 302 included in a one-dimensional sensor pattern 300 is individually controlled and sensed. For example, each sensor has a separate terminal, and corresponds to an exclusive and independent sensing line. The sensor cell 302 can be of any proper geometric shape, e.g. a triangle, square or hexagon. The one-dimensional sensor pattern 300 according to the present invention exhibits a multi-touch function and costs less than two-dimensional touch sensors in manufacturing. Details of the associated technology are disclosed in US Patent Publication No. 2014/0035865.

Generally, to conduct pen writing on a capacitive touch panel, the pen should be conductive and the diameter of the pen tip should be around 6 mm to 9 mm. Thus it is not practical and flexible enough for dramatically increasing uses of touch panels. According to the invention, in addition to conventional pens, a non-conductive pen or a pen having a tip size as small as 2 mm can be advantageously used for press sensing control.

Figure 4:
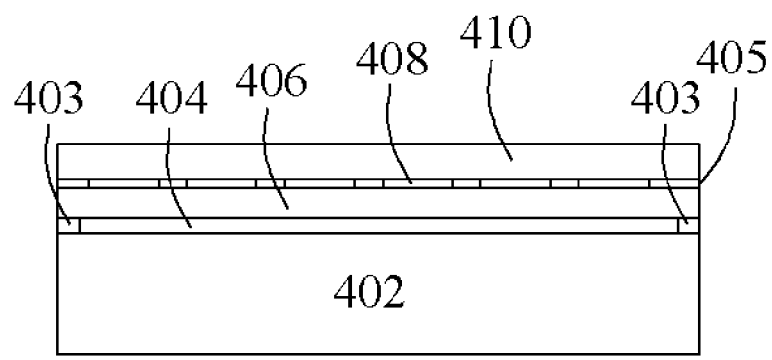
FIG. 4 is a schematic cross-sectional view of a capacitive touch panel according to an embodiment of the invention.

FIG. 4 illustrates an embodiment of a capacitive touch panel according to the invention. The capacitive touch panel has a single sensor layer and comprises: a base 402 serving as a ground; and a sensor layer 405 consisting of an array of sensor cells 408 and positioned over the base 402. The capacitive touch panel further comprises a sensor plate 410 covering the sensor layer 405. For example, the base 402 may be a liquid crystal module which displays images, or a printing circuit board (PCB) of an underlying electronic module such as a keyboard, or a touch pad.

Furthermore, the sensor layer 405 consisting of the sensor cells 408 are formed on a flexible dielectric layer 406, and the flexible dielectric layer 406 is positioned over the base 402.

Optionally, the gaskets 403 is positioned between the flexible dielectric layer 406 and the base 402 so as to form a gap 404 between the flexible dielectric layer 406 and the base 402. The existence of the gap 404 thus provides a space for depressed and deforming flexible dielectric layer 406.

Figure 5A:
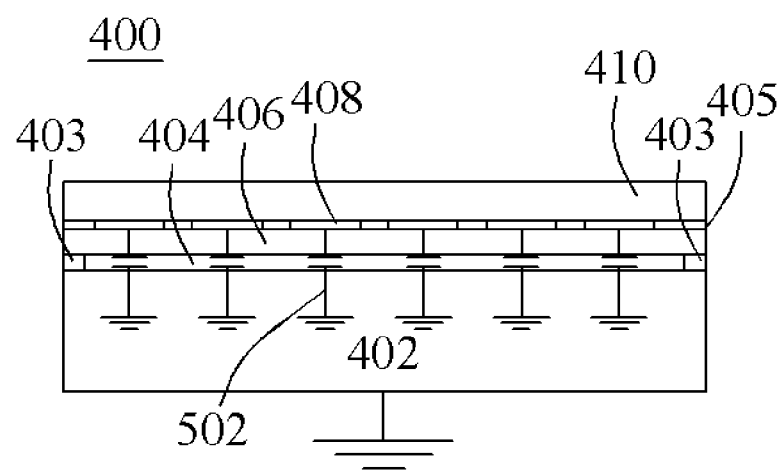
FIG. 5A is a schematic cross-sectional view of the capacitive touch panel as illustrated in FIG. 4, showing the use of an underlying liquid crystal module as ground.

In this embodiment, each sensor cell 408 of the capacitive touch panel 400 forms a capacitor 502 with the base 402 which serves as ground, as illustrated in FIG. 5A.

Figure 5B:
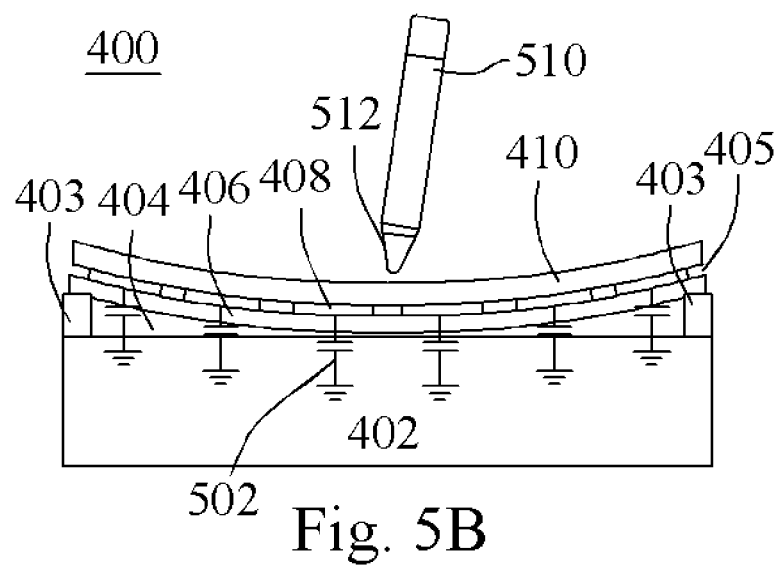
FIG. 5B is a schematic cross-sectional view of the capacitive touch panel as illustrated in FIG. 4, showing press sensing control with pen writing.

When an external force is exerted on the panel 400, e.g. pen writing on the sensor plate 410 as shown in FIG. 5B, the clearance between the sensor layer 405 and the ground 402 changes due to deformation so as to change capacitance therebetween. Since the press sensing control as described above is responsive to a clearance change instead of electronic sensing, it is not necessary to use an electrically conductive pen 510. Meanwhile, the pen tip does not have to be as large as the conventionally used pen. Consequently, the press sensing control according to the present invention can have better resolution than the conventional panels. Alternatively, the external force may be exerted with a finger or any other suitable article.

Figure 6:
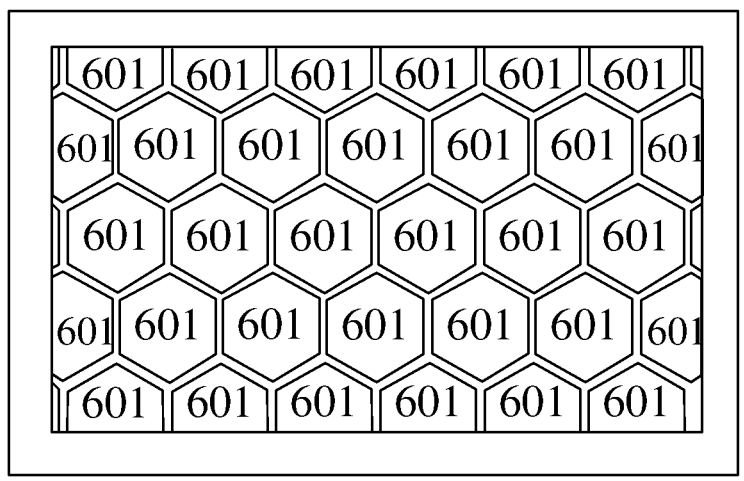
FIG. 6 is a schematic diagram illustrating an example of a one-dimensional sensor array according to the invention, which is arranged as a honeycomb shape pattern.

FIG. 6 exemplifies a configuration of the sensor layer. In this example, the sensor layer includes a sensor array 610 of a honeycomb-shaped pattern. The pen used in this example for press sensing control is made of non-conductive material and has a tip diameter of 1~2 mm. The sensor array 610 comprises row and columns of sensor cells 601. The sensor cells 601 are formed on a dielectric layer, which is in a form of a film or a glass sheet. The sensor cells are transparent and shaped as hexagons. As shown, the hexagons are arranged side by side with six hexagons surrounding one (except for the edge ones). In one case, the sensing output correlates to the sensor cell being touched. Alternatively, the sensing output may correlate to two or more sensor cells if two or more sensor elements are touched. Furthermore, multiple output signals may be generated.

Figure 7:
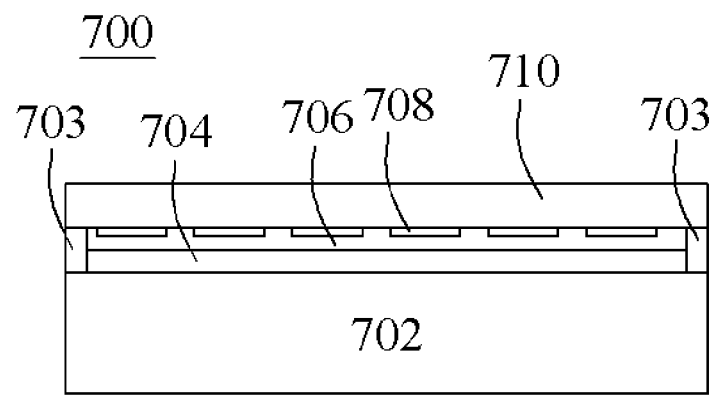
FIG. 7 is a schematic cross-sectional view of a capacitive touch panel according to another embodiment of the invention.

FIG. 7 is a schematic cross-sectional view of a capacitive touch panel according to another embodiment of the invention. The capacitive touch panel comprises: a liquid crystal module 702 for displaying images, which serves as a ground; and a pattern layer with sensor cells 708 positioned over the liquid crystal module 702 wherein the sensor cells 708 form a sensor array. The capacitive touch panel further comprises a sensor plate 710 for covering the pattern layer. Gaskets 703 are arranged between the sensor plate 710 and the liquid crystal module 702. A spacer film 706 is used as a flexible dielectric layer, and positioned between the gaskets 703 and under the pattern layer. A gap 704 thus exists between the spacer film 706 and the liquid crystal module 702, wherein the spacer film 706 and the sensor plate 710 are flexible, and the gap 704 exists for providing a space for depressing and deforming of the sensor plate 710 and the spacer film 706.

The method of producing a capacitive touch panel as illustrated in FIG. 7 comprises the following steps of: forming a pattern layer with sensor cells 708 on a sensor plate 710, wherein the sensor plate 710 could be Poly (methyl methacrylate) (PMMA) for lowering cost in manufacturing; forming a spacer film 706 on the pattern layer consisting of sensor cells 708; and turning the assembly of the sensor plate 710, the pattern layer, and the spacer film 706 upside down to cover a liquid crystal module 702 with gaskets 703 positioned between the sensor plate 710 and the liquid crystal module 702.

Figure 8:
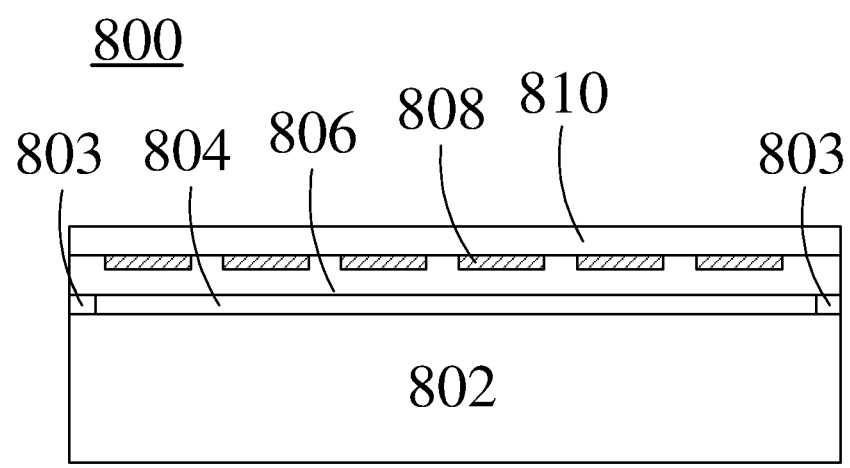
FIG. 8 is a schematic cross-sectional view of a capacitive touch panel according to a further embodiment of the invention.

FIG. 8 is a schematic cross-sectional view of a capacitive touch panel according to a further embodiment of the invention. The capacitive touch panel 800 comprises: a liquid crystal module 802 for displaying images, which serves as a ground; and a pattern layer consisting of sensor cells 808 positioned over the liquid crystal module 802 wherein the sensor cells 808 form a sensor array. The capacitive touch panel 800 further comprises: a sensor plate 810 for covering the pattern layer; and a spacer film 806 used as a flexible dielectric layer and positioned between the liquid crystal module 802 and the sensor plate 810, and under the pattern layer. There are gaskets 803 positioned between the spacer film 806 and the liquid crystal module 802, and thus a gap 804 exists between the spacer film 806 and the liquid crystal module 802, wherein the spacer film 806 and the sensor plate 810 are flexible, and the gap 804 is provided for allowing the deformation of the sensor plate 810 and the spacer film 806.

The method of producing a capacitive touch panel as illustrated in FIG. 8 comprises the following steps of: forming a pattern layer consisting of sensor cells 808 on a sensor plate 810, wherein the sensor plate 810 may be Indium Tin Oxide (ITO) for cost reduction; forming a spacer film 806 on the pattern layer, wherein the spacer film 806 may be Polyethylene Terephthalate film; and turning the assembly of the sensor plate 810, the pattern layer, and the spacer film 806 upside down to cover a liquid crystal module 802 with gaskets 803 positioned between the spacer film 806 and the liquid crystal module 802. In the touch panel module illustrated in FIG. 7 or FIG. 8 may adopt the above-described honeycomb-shaped one-dimensional sensor layer pattern.

Figure 9:
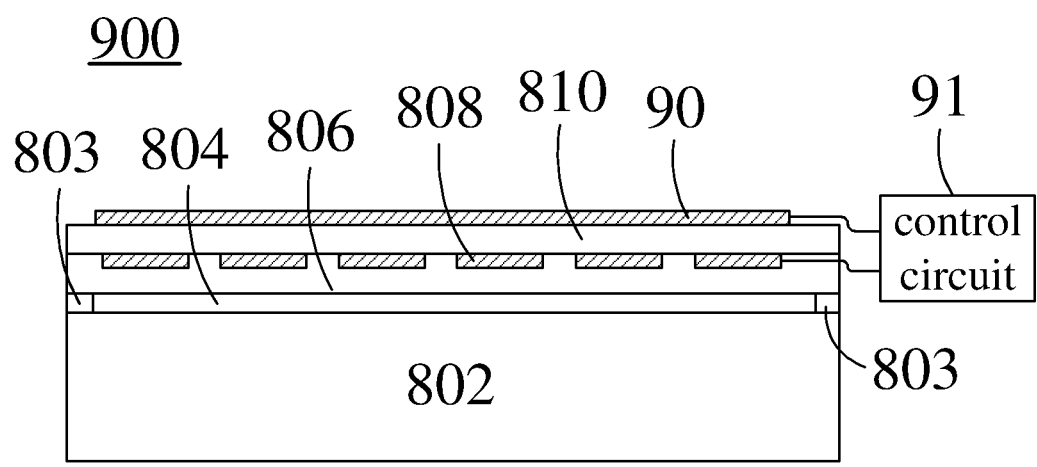
FIG. 9 is a schematic cross-sectional view of a capacitive touch panel according to still another embodiment of the invention.

Please refer to FIG. 9, in which a capacitive touch panel according to still another embodiment of the invention is schematically illustrated. The capacitive touch panel 900 illustrated in FIG. 9 is similar to that illustrated in FIG. 8 except that an electrode pattern layer 90 is formed on the sensor plate 810. Preferably, a protective film (not shown) additionally overlies the resulting structure for protecting the electrode pattern layer 90. Alternatively, the electrode pattern layer 90 may be formed on the protective film first, and then flipped onto the sensor plate 810. The electrode pattern layer 90 is electrically connected to a control circuit chip 91, which is also electrically connected to the sensor cells 808 for driving the sensor cells 808 to perform capacitive sensing. Please refer to US Patent Publication No. 2014/0035865 for more driving details. In this embodiment, each sensor cell 808 is entirely covered by the electrode pattern layer 90. The control chip 91 selectively controls the electrode pattern layer 90 to be in a grounded state or a floating state. When the electrode pattern layer 90 is in a grounded state, i.e. coupled to a zero level or another constant voltage, no capacitive touch sensing could be induced by the sensor cells 808 because the conductive object or finger touching or approaching the sensor plate 810 will be shielded by the electrode pattern layer 90. Nevertheless, press sensing control in response to a distance change between the sensor cells 808 and the base, e.g. the liquid crystal module 802, can be performed by the control circuit 91. On the other hand, if the electrode pattern layer 90 is in a floating state, the presence of the electrode pattern layer 90 will intensify the touching or approaching effect of the conductive object or finger so as to improve the sensing effect of the sensor cells 808.

For example, the above-described grounded state and floating state can be switched by the control circuit 91 in a time-division multiplexing manner. The duration ratio may be 1:1 or any other suitable proportion.

Figure 10:
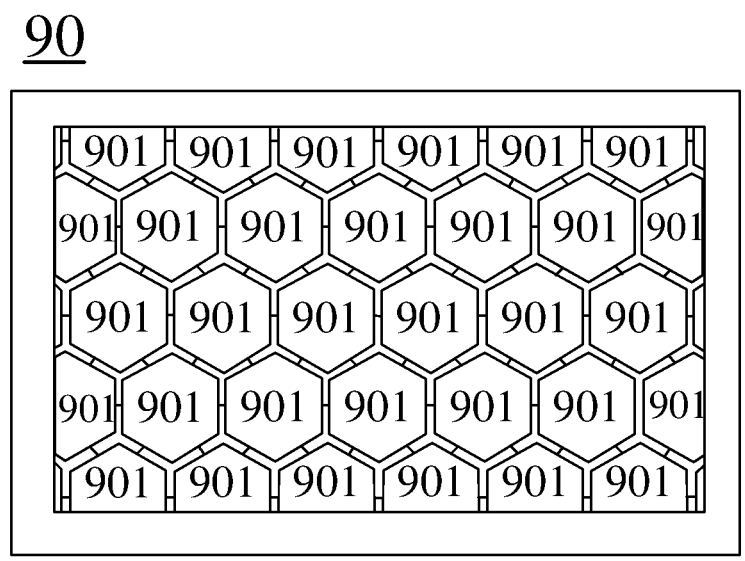
FIG. 10 is a schematic diagram illustrating an example of an electrode patter layer according to the invention used for improving effects of touch sensing control and press sensing control.

FIG. 10 schematically exemplifying a configuration of the electrode pattern layer 90. The electrode pattern layer 90 consists of row and columns of electrode cells 901 interconnected to one another. In this example, each of the electrode cells 901 is identically or similarly shaped and allocated as the sensor cell 808 thereunder. For example, all of the sensor cells 808 and the electrode cells 901 are hexagons, each being surrounded with six other hexagons (except for the edge ones).

The above electrode pattern layer is applicable to not only the embodiment as illustrated in FIG. 8 but also other embodiments illustrated above and having not been illustrated herein due to limited space. Therefore, the invention provides the pen writing function on the one-dimensional touch sensor which can be used for the capacitive multi-touch function, and the pen writing function is similar to the writing of the normal pen. Further, the pen can be made of non-conductive material to exert the pressure on the touch screen, such that the detection of position is based on the capacitance variation of the mechanical bending from the writing pressure. Moreover, the liquid crystal module of the touch screen serves as the ground which is the reference for each sensor element.

The foregoing description, for purposes of explanation, was set forth in specific details of the preferred embodiments to provide a thorough understanding of the invention. However, it will be apparent to one skilled in the art that specific details are not required in order to practice the invention. Therefore, the foregoing descriptions of specific embodiments of the invention are presented for purposes of illustration and description only and should not be construed in any way to limit the scope of the invention. They are not intended to be exhaustive or to limit the invention to the precise forms disclosed; obviously, many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following Claims and their equivalents define the scope of the invention.

The above-described embodiments of the present invention are intended to be illustrative only. Numerous alternative embodiments may be devised by those skilled in the art without departing from the scope of the following claims.

What is claimed is:

1. A touch panel comprising:
   a base, which is a liquid crystal module serving as a ground;
   a flexible dielectric layer over the base; and
   a one-dimensional pattern layer with sensor cells positioned as the same layer over the flexible dielectric layer, wherein the sensor cells form a sensor array, and each of the sensor cells is individually controlled and sensed via an independent sensing line;
   wherein press sensing control is conducted according to a capacitance change resulting from a distance change between the sensor array and the base in response to an external force, and touch or gesture-based sensing control is conducted according to a capacitance change in the sensor array without involving the base.

2. The touch panel of claim 1, wherein the capacitance change in the sensor array is caused by capacitive coupling of a conductive object to the sensor array.

3. The touch panel of claim 1 further comprising: a sensor plate positioned over the sensor array for protecting the sensor array.

4. The touch panel of claim 1, wherein the sensor cells are hexagon and are arranged to form a honeycomb sensor array.

5. The touch panel of claim 2, wherein the press sensing control is conducted with a pen to produce the external force.

6. The touch panel of claim 1, further comprising a control circuit, and an electrode pattern layer over the one-dimensional pattern layer, wherein the electrode pattern layer is electrically connected to the control circuit and controlled by the control circuit to switch between a grounded state for facilitating press sensing control and a floating state for facilitating touch sensing control.

7. The touch panel of claim 6, wherein the switching of the electrode pattern layer between the grounded state and the floating state is in a time-division multiplexing manner.

8. The touch panel of claim 6, further comprising a sensor plate positioned over the sensor array for protecting the sensor array, wherein the electrode pattern layer is formed on the sensor plate.

9. The touch panel of claim 6, wherein the control circuit is electrically connected to both the electrode pattern layer and the sensor array.

10. The touch panel of claim 6, wherein the electrode pattern layer includes a plurality of electrode cells, which entirely cover each of the sensor cells.

11. The touch panel of claim 10, wherein each of the electrode cell is identically or similarly shaped as the sensor cell thereunder.

12. A touch panel comprising:
   a liquid crystal module for displaying images and serving as a ground;
   a pattern layer with sensor cells positioned as the same layer over the liquid crystal module wherein the sensor cells form a sensor array and each of the sensor cells is individually controlled and sensed via an independent sensing line;
   a sensor plate positioned over the sensor array for protecting the sensor array; and
   a spacer structure positioned between the sensor plate and the liquid crystal module; and
   wherein the spacer structure and the sensor plate are flexible, and the gap is used for allowing deformation of the sensor plate and spacer structure; and
   wherein press sensing control is conducted according to a capacitance change between the sensor array and the liquid crystal module, and touch or gesture-based sensing control is conducted according to a capacitance change in the sensor array without involving the liquid crystal module.

13. The touch panel of claim 12, wherein the capacitance change in the sensor array is caused by capacitive coupling of a conductive object to the sensor array, and the capacitance change between the sensor array and the base is caused by a distance change between the sensor array and the base in response to an external force.

14. The touch panel of claim 12, wherein the spacer structure includes gaskets positioned between the sensor plate and the liquid crystal module and forming therebetween a gap.

15. The touch panel of claim 14, wherein the spacer structure includes a flexible spacer film positioned inside the gaskets and under the pattern layer such that the gap is formed between the spacer film and the liquid crystal module.

16. The touch panel of claim 14, wherein the spacer structure includes a flexible spacer film positioned over the gaskets and the gap and under the pattern layer such that the gap is formed between the spacer film and the liquid crystal module.

17. The touch panel of claim 12, further comprising a control circuit, and an electrode pattern layer over the one-dimensional pattern layer, wherein the electrode pattern layer is electrically connected to the control circuit and controlled by the control circuit to switch between a grounded state for facilitating press sensing control and a floating state for facilitating touch sensing control.

18. The touch panel of claim 17, wherein the switching of the electrode pattern layer between the grounded state and the floating state is in a time-division multiplexing manner.

19. The touch panel of claim 17, further comprising a sensor plate positioned over the sensor array for protecting the sensor array, wherein the electrode pattern layer is formed on the sensor plate.

20. The touch panel of claim 17, wherein the control circuit is electrically connected to both the electrode pattern layer and the sensor array.

21. The touch panel of claim 17, wherein the electrode pattern layer includes a plurality of electrode cells, which entirely cover each of the sensor cells.

22. The touch panel of claim 21, wherein each of the electrode cell is identically or similarly shaped as the sensor cell thereunder.

* * * * *